United States Patent [19]

Kendall et al.

[11] Patent Number: 4,699,734

[45] Date of Patent: Oct. 13, 1987

[54] FLAME-RETARDANT POLYOLEFIN COMPOSITIONS CONTAINING EXUDATION INHIBITOR AND PROCESS FOR PRODUCING SAME

[75] Inventors: Shirley N. Kendall; Ramesh Rengarajan, both of Akron, Ohio

[73] Assignee: A. Schulman, Inc., Akron, Ohio

[21] Appl. No.: 795,369

[22] Filed: Nov. 6, 1985

[51] Int. Cl.$^4$ .......... C09K 21/00; B27N 9/00; C08K 3/16

[52] U.S. Cl. .......... 252/609; 106/18.11; 106/18.12; 106/18.24; 106/18.28; 260/DIG. 24; 428/920; 428/921; 521/907; 521/908; 524/81; 524/411; 524/412; 524/467

[58] Field of Search ........ 252/601, 606, 609, 610–611, 252/; 428/920–921

[56] References Cited

U.S. PATENT DOCUMENTS

| | | | |
|---|---|---|---|
| 2,590,211 | 3/1952 | Rugar | 106/15 |
| 3,275,715 | 9/1966 | O'Leary, Jr. | 260/889 |
| 3,331,806 | 7/1967 | Fior et al. | 260/41 |
| 3,374,187 | 3/1968 | Hare | 260/2.5 |
| 3,403,118 | 9/1968 | Listner | 260/23 |
| 3,640,949 | 2/1972 | Dalzell | 252/609 |
| 3,730,929 | 5/1973 | Breza | 260/23 H |
| 3,730,940 | 5/1973 | Versnel et al. | 260/41 A |
| 3,741,893 | 6/1973 | Mascioli et al. | 252/8.1 |
| 3,962,164 | 6/1976 | Praetzel et al. | 252/609 |
| 4,006,118 | 2/1977 | Ogawa et al. | 260/45.7 B |
| 4,044,072 | 3/1977 | Touval | 260/859 |
| 4,101,498 | 7/1978 | Snyder | 260/33.6 |
| 4,117,219 | 9/1978 | Kokagawa et al. | 260/45.95 R |
| 4,147,741 | 3/1979 | Slama et al. | 260/878 R |
| 4,234,469 | 11/1980 | Ohta et al. | 260/42.46 |
| 4,353,820 | 10/1982 | Lindvay | 260/45.75 |
| 4,397,972 | 8/1983 | Marien | 524/109 |
| 4,606,852 | 8/1986 | Teuerstein et al. | 252/609 |

*Primary Examiner*—Stephen J. Lechert, Jr
*Assistant Examiner*—Howard J. Locker
*Attorney, Agent, or Firm*—Gordon W. Hueschen

[57] ABSTRACT

The invention relates to base polyolefin compositions, and concentrates thereof adapted to be let down or diluted by addition of further polyolefin, flameproofed by incorporation therein of an organohalo flame-retardant and a metal oxide or sulfide synergist, are rendered resistant to exudation by incorporating therein the combination of an epoxy resin, an elastomeric resin, and a nucleating agent, the epoxy resin being present in an amount of from about 0.01 to about 10 percent, the elastomeric resin being present in an amount of from about 0.1 to about 20 percent, and the nucleating agent being present in an amount of from about 0.1 to about 10 percent and non-fogging molded products obtained thereby.

28 Claims, No Drawings

FLAME-RETARDANT POLYOLEFIN COMPOSITIONS CONTAINING EXUDATION INHIBITOR AND PROCESS FOR PRODUCING SAME

BACKGROUND OF THE INVENTION

1. Field of the Invention and Prior Art

The invention relates to a method for inhibiting exudation or blooming in flame-retardant polyolefin compositions and to an exudation inhibited flame-retardant polyolefin composition.

In the known art of flameproofing olefins, halogen donor compounds, together with antimony oxide, and sometimes other oxides for reduction of afterglow, are incorporated into the olefinic polymer. The greater percentage of these halogen donor compounds have a high-melting point or are polymeric. Therefore, they themselves act as fillers and are compatable with the system and as such do not tend to exude to the surface.

When halogen donors which have a relatively low-melting point and which are incompatable with the system are employed, there is a tendency for them to migrate to the surface during the processing or use of the flameproofed polymer. These particular additives are very efficient for flameproofing purposes and are cost effective. However, due to the poor compatability and dispersion qualities, they tend to migrate to the surface and thus impair both the surface appearance and the flameproofing effectiveness of the composition.

The invention accordingly is directed to improvements in flameproofed polyolefinic compositions in which there is a tendency for the flame retardant to exude from the surface, and is directed to a method for inhibiting this exudation.

In accordance with U.S. Pat. No. 3,730,929, the tendency toward exudation or "blooming" can be minimized by incorporating a saturated fatty acid or metal salt thereof. The results obtained, however, have not been wholly satisfactory.

It has been proposed in U.S. Pat. No. 4,006,118 that the problem can be reduced by changing the molecular structure of the organo metal retardant. But this, too, has not been entirely satisfactory and is not a solution to the existing problem.

The problem also has been attacked by incorporating a "dispersant" to effect proper dispersion of the flame retardant in the resin matrix. See, for example, U.S. Pat. No. 3,403,118. This, too, has not been entirely satisfactory.

SUMMARY OF THE INVENTION

The invention therefore is directed to improvements in a process for flameproofing a polyolefin composition by incorporating therein an organohalo flame-retardant and a metal oxide or sulfide synergist, wherein the flame-retardant tends to exude or bloom thereby impairing both the surface appearance and the fire-retardant property of the composition, and is particularly directed to a method of inhibiting said exudation or blooming which comprises incorporating in said base composition an epoxy resin, an elastomeric resin, and a nucleating agent, the epoxy resin being present in an amount of about 0.01 to about 10 percent, the elastomeric resin being present in an amount of about 0.1 to about 20 percent, and the nucleating agent being present in an amount of about 0.01 to about 10 percent and being characterized as a finely divided mineral selected from silicon dioxide and insoluble silicates and having an average particle size of not greater than four microns.

The invention also comprises a polyolefin molding composition or concentrate adapted to be let down by the addition of polyolefin thereto which is flameproofed by having incorporated therein an organohalo flame-retardant and a metal oxide or sulfide synergist and which has further incorporated therein, as exudation-inhibiting ingredients, an elastomeric resin, an epoxide resin, and a nucleating agent and wherein, in said molding composition or said let-down concentrate, said elastomeric resin is present in an amount of from about 0.1 to about 20 percent, said epoxide resin has an epoxide equivalent of from about 10 to about 10,000 and is present in an amount from about 0.01 to about 10 percent, and said nucleating agent is a finely divided mineral selected from silicon dioxide and insoluble silicates and has an average particle size not greater than about four microns, the molding obtained from said polyolefin composition, without the addition of said exudation-inhibiting ingredients, being characterized by the tendency of said flame-retardant to exude to the surface thereof and thus to impair both the surface appearance and the fire-retardant property of the composition, as well as a non-blooming thermoplastic resin molded product molded from a molding composition which is flameproofed by having incorporated therein an organohalo flame-retardant and a metal oxide or sulfide synergist and which has further incorporated therein, as exudation-inhibiting ingredients, an elastomeric resin, an epoxide resin, and a nucleating agent, said elastomeric resin being present in an amount from about 0.1 to about 20 percent, said epoxide resin having an epoxide equivalent of from about 10 to about 10,000 and being present in an amount from about 0.01 to about 10 percent, and said nucleating agent being a finely divided mineral selected from silicon dioxide and insoluble silicates and having an average particle size of not greater than about four microns, the molded product obtained from said polyolefin composition, without the addition of said exudation-inhibiting ingredients, being characterized by the tendency of said flame-retardant to exude to the surface thereof and thus to impair both the surface appearance and the fire-retardant property of the composition.

The invention further comprises one or more further features in which the metal of the synergist is antimony, tin, bismuth, arsenic, or titanium; in which the amount of said finely divided mineral is below that at which it functions as a filler; in which the amount of said finely divided mineral is below about 5 percent; in which the polyolefinic composition consists essentially of polypropylene and the nucleating agent consists essentially of a silicon dioxide; in which the silicon dioxide is a fire-dried fumed silica having a surface area between about 200 and about 400 m$^2$/gm; and in which the synergist is antimony trioxide and the epoxy resin has an epoxide equivalent of about 220, and wherein the elastomeric resin is styrene-butadiene-styrene (SBS) block copolymer.

DESCRIPTION OF THE PREFERRED EMBODIMENTS

The base compositions to which the present invention is directed are polyolefins which have been flameproofed by an organohalo flame-retardant supplemented by a metal oxide or sulfide synergist in which there is a tendency of the fire retardant to migrate to the surface forming unsightly exudates. These base compositions include polymers or copolymers of alpha-olefins, such as ethylene, propylene, butene-1, 4-methylpentene, 1,3-methylbutene and the like, and mixtures thereof.

The organohalo flame-retardants are generally monomeric, relatively low-melting compounds, that is to say, compounds which melt near or below the processing temperature of the resin. They are incompatible with the resin so that a homogenous admixture is difficult to obtain and whatever admixture is obtained is subject to the migration of the flame-retardant to the surface. Suitable such organohalo fire-retardants include tris(2,3-dibromopropyl)isocyanurate, cyclic alkyl bromides, for example, hexabromocyclododecane, tetrabromobisphenol A, decabromodiphenyl oxide, bis(2,3-dibromopropyl)ether of tetrabromobisphenol A, ethylene-(5,6-dibromonobornane-2,3-dicarboximide), as well as mixtures and derivatives conventionally used in polyolefin compositions, whether brominated or chlorinated.

Metal oxides or sulfides which volatilize when the flameproofed olefin is exposed to burning temperatures are commonly incorporated as synergists. Oxides or sulfides of polyvalent metals such as antimony, arsenic, bismuth, tin, or titanium are commonly used in the art. Antimony oxides, particularly antimony trioxide, are particularly useful for this purpose.

As elastomeric resins there may be used polymers or copolymers which are elastomeric and compatible polyolefin modifiers. Suitable such elastomers include EP, EPDM, EVA, EEA, SBS block copolymer, CPE, polybutadiene, polyisoprene, polybutylene, polyurethane elastomer, and so forth.

Many polyolefins suitable for treatment according to the invention already contain an elastomer blended in the composition and it is to be understood that such elastomer is to be taken into account in figuring the amount of elastomer to be added for the purpose of this invention.

As epoxy resins there may be used any epoxy resin with two or more terminal epoxide groups (oxirane rings) which is compatible with the base olefins. Commercially available epoxy resins useful in the invention commonly range from 100 to 6,000 epoxy equivalents (grams of resin containing 1 g equivalent of epoxide), but the invention is not limited in this respect as epoxy resins having epoxy equivalents from 10 to 10,000 can be used.

As nucleating agents, there may be used finely divided insoluble minerals such as are commonly used as fillers in plastic manufacture. Various forms of silica such as silicon dioxide and insoluble silicates can be used. Natural minerals such as talc, Fuller's earth, and the like are suitable.

The nucleating agent should be comminuted to an average particle size of not more than four microns so that it can be freely dispersed in the free space of the resin.

The particle size is also a measure of the surface characteristics and it is ordinarily desirable to have the material so finely comminuted that it has a surface area from about 200 to about 400 $m^2/gm$. Any insoluble mineral having this particle size or these surface characteristics can be used as a nucleating agent.

These comminuted minerals perform two functions in the compositions of the invention, namely, that of a nucleating agent and that of a filler, depending upon the amount used. Thus, it is common in the art to use such fillers as silicon dioxide, magnesium silicate, calcium silicate, and the like, for cost-extenders and to assist in preventing the polymer from dripping. Some say between 15 and 25 percent loading is required to accomplish this. See, for example, U.S. Pat. No. 3,730,940. The nucleating effect, however, is obtained by minute quantities, ranging from 0.01 percent to 1 percent and greater. Thus, when the finely divided mineral is used in amounts below that at which it functions as a filler, i.e., from about 0.01 percent to up to about 5 percent, it is functioning almost exclusively as a nucleating agent whereas, when it is used from between about 5 to about 10 percent or more, it is functioning both as a nucleating agent and as a filler. Percentages are by weight unless otherwise specified.

Base olefin compositions flameproofed by incorporation therein of an organohalo flame-retardant and a metal oxide or sulfide synergist are rendered resistant to exudation by incorporating therein the combination of an epoxy resin, an elastomeric resin, and a nucleating agent, the epoxy resin being present in an amount of from about 0.01 to about 10 percent, the elastomeric resin being present in an amount of from about 0.1 to about 20 percent, and the nucleating agent being present in an amount of from about 0.1 to about 10 percent. Advantageously, the epoxy resin and elastomeric resin are in approximately equal proportions ranging from about 2 to 1 to about 1 to 2. As already pointed out, if the base polyolefin composition contains an elastomer, the content of the elastomer should be figured into the amount of from about 0.1 to about 20 percent and in the proportions stated.

The invention may be more fully understood from the examples given in Table I. The parts and percentages are by weight unless otherwise specified.

The ingredients were blended into a homogenous mass at 200° C. and injection molded into placques in conventional injection molding apparatus. The placques were examined for surface appearance
(1) immediately after molding,
(2) after fourteen days at room temperature, and
(3) after twenty-four hours at 150° C.

The rating "E" indicates lack of exudation and excellent surface appearance.

The polyolefin in Examples 1, 2, 3, and 4 was a polypropylene homopolymer, Himont 6501. It had a density of 0.901, characteristic of polypropylene homopolymers in general. The flame-retardant was bis(2,3-dibromopropyl)ether of tetrabromo-bisphenol A. The synergist was antimony trioxide. The elastomer was styrene-butadiene-styrene (SBS) block copolymer, Kraton 1102. The epoxy was an epoxide resin, Epon 1031, having an epoxy equivalent of about 220 and containing four terminal epoxide groups. The nucleating agent was Cab-O-Sil (HS-5 grade), a fire-dried fumed silica having an average particle size of 0.014 microns and a surface of 325 square meters per gram.

TABLE I

| Example No. | Polyolefin | Flame Retardant | Synergist | Elastomer | Epoxy | Nucleating Agent | After Molding | 15 Days R.T. | Accelerated Overage |
|---|---|---|---|---|---|---|---|---|---|
| 1 | 95.4 | 1 | 0.5 | 2.5 | 0.5 | 0.1 | E | E | E |
| 2 | 92.4 | 3 | 1 | 2.5 | .8 | .3 | E | E | E |
| 3 | 81.7 | 8 | 3 | 5 | 1.5 | 0.8 | E | E | E |
| 4 | 27.0 | 32 | 12 | 20 | 6 | 3.0 | E | E | E |

When the elastomer, the epoxy resin, and the nucleating agent were omitted, the results were poor across the board.

When the epoxy and nucleating agent were omitted, the initial appearance was fair, but after aging, poor.

When the elastomer and the nucleating agent were omitted, the results were initially fair, but poor after aging.

When the elastomer and epoxy resin were omitted, the results were initially fair, but poor after aging.

When the nucleating agent was omitted, the results were initially good, but only fair after aging.

When the epoxy resin was omitted, the results were initially good, but only fair to poor after aging.

When the elastomer was omitted, the results were initially fair, and only fair to poor after aging.

Different grades of Cab-O-Sil are available, ranging from fire-dried fumed silicate having a surface area of 200 m$^2$/gm to fire-dried fumed silica having a surface area of 400 m$^2$/gm. Any of these can be used advantageously in the above. Also, there may be substituted other forms of finely divided silica, such as other forms of essentially pure silicon dioxide as well as coordination complexes of silica with other metal oxides, such as talc, Fuller's earth, and the like.

Examples 2, 3, and 4 were repeated as Examples 2a, 3a, and 4a substituting Himont 6501 by a general purpose polyethylene, Norchem 953 of 0.918 density, and as Examples 2b, 3b, and 4b substituting the Himont 6501 by Fortiflex +50–1000 of 0.952 density with like good results.

The formulations of the above Examples advantageously are formulated as concentrates with only a portion of the ultimate amount of polyolefin and letdown to the formulations in the Examples. In such cases the amount of polyolefin in the concentrate is such that the appropriate additional amount of the olefin (the same or different), for example, two to fifteen parts of polyolefin for each part of concentrate, gives the final compositions, for example, those of Examples 1, 2, and 3. Suitable such concentrates are given in the following table:

TABLE II

| Example No. | Polyolefin | Flame Retardant | Synergist | Elastomer | Epoxy | Nucleating Agent | Let-Down Ratio |
|---|---|---|---|---|---|---|---|
| 1' | 86.8 | 2.8 | 1.4 | 7.02 | 1.4 | 0.28 | 2:1 |
| 1" | 63.2 | 8 | 4 | 20 | 4 | .8 | 7:1 |
| 1''' | 26.4 | 16 | 8 | 40 | 8 | 1.6 | 15:1 |
| 2' | 69.6 | 12 | 4 | 10 | 3.2 | 1.2 | 3:1 |
| 3' | 44.3 | 24 | 9 | 15 | 4.5 | 3.2 | 2:1 |

On adding a polyolefin to the concentrates exemplified in the above primed Examples, in the proportions stated, molding compositions corresponding, respectively, to Examples 1, 2, and 3 are obtained. These molding compositions, whether formulated direct as in Examples 1, 2, and 3 or from concentrates, have UL 94 ratings of 94 V-0, 94 V-1, 94 V-2, or HB without blooming. For example, addition of 200, 700, and 1,500 parts of Himont 6501 to the concentrates of Examples 1', 1", and 1''', respectively, gives the molding composition of Example 1. Likewise, on adding 300 parts of Himont 6501 to the concentrate of Example 2', there is obtained essentially the same molding composition as in Example 2. Also, addition of 200 parts of Himont 6501 to the concentrate of Example 3' gives essentially the same molding composition as in Example 3.

As in the unprimed Examples, part or all of the polypropylene Himont 6501 of the primed Examples can be substituted by other polyalkylenes, for example, the polyethylenes Norchem 953 of 0.918 density or Fortiflex +50–1000 of 0.952 density.

It is to be understood that the invention is not to be limited to the exact details of operation or exact compounds, compositions, methods, or procedures shown and described, as various modifications and equivalents will be apparent to one skilled in the art.

I claim:

1. A process for inhibiting exudation or blooming of flame retardant in a polyolefin composition flameproofed by the incorporation therein of an organohalo flame retardant and a metal oxide or sulfide synergist which comprises further incorporating therein, as exudation-inhibiting ingredients, an elastomeric resin, an epoxide resin, and a nucleating agent, said epoxide resin having an epoxide equivalent of from about 10 to about 10,000 and being present in an amount of about 0.01 to about 10 percent, the elastomeric resin being present in the amount of about 0.1 to about 20 percent, and the nucleating agent being characterized as a finely-divided mineral selected from silicon dioxide and insoluble silicates and having an average particle size not greater than about four microns, the amount of said finely divided mineral being below that at which it functions as a filler.

2. A process of claim 1, in which the metal of the synergist is antimony, tin, bismuth, arsenic, or titanium.

3. A process according to claim 2, in which said finely-divided mineral is present in an amount between about 0.01 and about 5 percent and functions almost exclusively as a nucleating agent, the synergist is antimony trioxide, and the elastomeric resin is styrene-butadiene-styrene (SBS) block copolymer.

4. A process according to claim 2, in which said finely-divided mineral is present in an amount below about 5 percent and functions almost exclusively as a nucleating agent, and in which the organohalo flame retardant is bis(2,3-dibromopropyl)ether of tetrabromobisphenol A.

5. A process of claim 2, in which the polyolefinic composition consists essentially of polypropylene and the nucleating agent consists essentially of a silicon dioxide.

6. A process of claim 5, in which the silicon dioxide is a fire-dried fumed silica having a surface area between about 200 and about 400 m$^2$/gm.

7. A process of claim 5 in which said finely-divided mineral is present in an amount between about 0.01 and about 5 percent and functions almost exclusively as a nucleating agent, the organohalo flame retardant is bis(2,3-dibromopropyl)ether of tetrabromobisphenol A, the synergist is antimony trioxide, and the elastomeric resin is styrene-butadiene-styrene (SBS) block copolymer.

8. A polyolefin molding composition, or a concentrate convertible into said composition by the addition of polyolefin thereto, which is flameproofed by having incorporated therein an organohalo flame retardant and a metal oxide or sulfide synergist and which has further incorporated therein, as exudation-inhibiting ingredients, an elastomeric resin, an epoxide resin, and a nucleating agent, said elastomeric resin in said molding composition being present in an amount from about 0.1 to about 20 percent, said epoxide resin having an epoxide equivalent of from about 10 to about 10,000 and is being present in an amount from about 0.01 to about 10 percent, and said nucleating agent being a finely-divided mineral selected from silicon dioxide and insoluble silicates and having an average particle size not greater than about four microns, the molded products obtained from said polyolefin composition, without the addition of said exudation-inhibiting ingredients, being characterized by the tendency of said flame retardant to exude to the surface thereof and thus to impair both the surface appearance and the fire-retardant property of the composition, the amount of said finely-divided mineral being below that at which it functions as a filler.

9. A composition of claim 8, in which the metal of the synergist is antimony, tin, bismuth, arsenic, or titanium.

10. A composition of claim 8, in which said finely-divided mineral is present in an amount below about 5 percent and functions almost exclusively as a nucleating agent, and in which the organohalo flame retardant is bis(2,3-dibromopropyl)ether of tetrabromobisphenol A.

11. A composition of claim 10, in which said finely-divided mineral is present in an amount between about 0.01 and about 5 percent and functions almost exclusively as a nucleating agent, the synergist is antimony trioxide, and the elastomeric resin is styrene-butadiene-styrene (SBS) block copolymer.

12. A composition of claim 9, in which the polyolefinic composition consists essentially of polypropylene and the nucleating agent consists essentially of a silicon dioxide.

13. A composition of claim 12, in which the silicon dioxide is a fire-dried fumed silica having a surface area between about 200 and about 400 m$^2$/gm.

14. A composition of claim 12, in which said finely-divided mineral is present in an amount between about 0.01 and about 5 percent and functions almost exclusively as a nucleating agent, the organohalo flame retardant is bis(2,3-dibromopropyl)ether of tetrabromobisphenol A, the synergist is antimony trioxide, the epoxy resin has an epoxide equivalent of about 220, and the elastomeric resin is styrene-butadiene-styrene (SBS) block copolymer.

15. A non-blooming molded thermoplastic resin product which is molded from a molding composition which is flameproofed by having incorporated therein an organohalo flame retardant and a metal oxide or sulfide synergist and which has further incorporated therein, as exudation-inhibiting ingredients, an elastomeric resin, an epoxide resin, and a nucleating agent, said elastomeric resin being present in an amount from about 0.1 to about 20 percent, said epoxide resin having an epoxide equivalent of from about 10 to about 10,000 and being present in an amount from about 0.01 to about 10 percent, and said nucleating agent being a finely-divided mineral selected from silicon dioxide and insoluble silicates and having an average particle size not greater than about four microns, the molded product obtained from said polyolefin composition, without the addition of said exudation-inhibiting ingredients, being characterized by the tendency of said flame retardant to exude to the surface thereof and thus to impair both the surface appearance and the fire-retardant property of the composition, the amount of said finely-divided mineral being below that at which it functions as a filler.

16. A non-blooming product of claim 15, in which metal of the synergist is antimony, tin, bismuth, arsenic, or titanium.

17. A non-blooming product of claim 15, in which said finely-divided mineral is present in an amount below about 5 percent and functions almost exclusively as a nucleating agent, and in which the organohalo flame retardant is bis(2,3-dibromopropyl)ether of tetrabromobisphenol A.

18. A non-blooming product of claim 17 in which said finely-divided mineral is present in an amount between about 0.01 and about 5 percent and functions almost exclusively as a nucleating agent, the synergist is antimony trioxide, the epoxy resin has an epoxide equivalent of about 220, and the elastomeric resin is styrene-butadiene-styrene (SBS) block copolymer.

19. A non-blooming product of claim 16, in which the polyolefinic composition consists essentially of polypropylene and the nucleating agent consists essentially of a silicon dioxide.

20. A non-blooming product of claim 19, in which the silicon dioxide is a fire-dried fumed silica having a surface area between about 200 and about 400 m$^2$/gm.

21. A non-blooming product of claim 19, in which said finely-divided mineral is present in an amount between about 0.01 and about 5 percent and functions almost exclusively as a nucleating agent, the organohalo flame retardant is bis(2,3-dibromopropyl)ether of tetrabromobisphenol A, the synergist is antimony trioxide, and the elastomeric resin is styrene-butadiene-styrene (SBS) block copolymer.

22. A polyolefin concentrate composition which is flameproofed by having incorporated therein an organohalo flame retardant and a metal oxide or sulfide synergist and which has further incorporated therein, as exudation-inhibiting ingredients, an elastomeric resin, an epoxide resin, and a nucleating agent, which is adapted to be converted by the addition of polyolefin thereto into a molding composition in which the elastomeric resin is present in an amount from about 0.1 to about 20 percent, said epoxide resin having an epoxide equivalent of from about 10 to about 10,000 percent, and said nucleating agent being a finely divided mineral selected from silicon dioxide and insoluble silicates and having an average particle size of not greater than about four microns, the molded product obtained from said polyolefin composition, without the addition of said exudation-inhibiting ingredients, being characterized by the tendency of said flame retardant to exude to the surface thereof and thus to impair both the surface appearance and the fire-retardant property of the composition, the amount of said finely-divided mineral being below that at which it functions as a filler.

23. A polyolefin concentrate composition of claim 22, in which metal of the synergist is antimony, tin, bismuth, arsenic, or titanium.

24. A polyolefin concentrate composition of claim 23, in which said finely-divided mineral is present in an amount below about 5 percent and functions almost exclusively as a nucleating agent, and in which the organohalo flame retardant is bis(2,3-dibromopropyl)ether of tetrabromobisphenol A.

25. A polyolefin concentrate composition of claim 25, in which said finely-divided mineral is present in an amount between about 0.01 and about 5 percent and functions almost exclusively as a nucleating agent, the synergist is antimony trioxide, and the elastomeric resin is styrene-butadiene-styrene (SBS) block copolymer.

26. A polyolefin concentrate composition of claim 23, in which the polyolefinic composition consists essentially of polypropylene and the nucleating agent consists essentially of a silicon dioxide.

27. A polyolefin concentrate composition of claim 26, in which the silicon dioxide is a fire-dried fumed silica having a surface area between about 200 and about 400 m$^2$/gm.

28. A polyolefin concentrate composition of claim 26, in which said finely-divided mineral is present in an amount between about 0.01 and about 5 percent and functions almost exclusively as a nucleating agent, the organohalo flame retardant is bis(2,3-dibromopropyl ether of tetrabromobisphenol A, the synergist is antimony trioxide, and the elastomeric resin is styrene-butadiene-styrene (SBS) block copolymer.

* * * * *

UNITED STATES PATENT AND TRADEMARK OFFICE
CERTIFICATE OF CORRECTION

PATENT NO. : 4,699,734
DATED : October 13, 1987
INVENTOR(S) : Shirley N. Kendall, et al It is certified that error appears in the above-identified patent and that said Letters Patent is hereby corrected as shown below:

Column 9, line 11, "25" should read -- 24 --.

Title page, (56) References Cited, U.S. Patent Documents, line 12, Col. 2; "3/1977" should read -- 8/1977 --.

Title page, (56) References Cited, U.S. Patent Documents, line 15, Col. 2; "3/1979" should read -- 4/1979 --.

Signed and Sealed this

First Day of March, 1988

Attest:

DONALD J. QUIGG

Attesting Officer

Commissioner of Patents and Trademarks